(12) United States Patent
Mayes et al.

(10) Patent No.: US 7,880,415 B2
(45) Date of Patent: Feb. 1, 2011

(54) CONTROL OF A BRUSHLESS ELECTRICAL MACHINE

(75) Inventors: Peter Richard Mayes, Bradford (GB); Michael James Turner, Leeds (GB)

(73) Assignee: Switched Reluctance Drives Limited, North Yorkshire (GB)

( * ) Notice: Subject to any disclaimer, the term of this patent is extended or adjusted under 35 U.S.C. 154(b) by 412 days.

(21) Appl. No.: 12/082,364

(22) Filed: Apr. 10, 2008

(65) Prior Publication Data

US 2008/0272721 A1 Nov. 6, 2008

(30) Foreign Application Priority Data

May 4, 2007 (GB) ................................. 0708739.8

(51) Int. Cl.
*H02P 1/04* (2006.01)
(52) U.S. Cl. ................... 318/400.17; 318/701; 318/138
(58) Field of Classification Search ................ 318/400, 318/17, 701, 138, 722, 700, 432, 773, 779, 318/782
See application file for complete search history.

(56) References Cited

U.S. PATENT DOCUMENTS

| | | | |
|---|---|---|---|
| 5,469,039 A | | 11/1995 | Stephenson et al. |
| 6,078,173 A | * | 6/2000 | Kumar et al. ............ 324/158.1 |
| 6,972,533 B2 | | 12/2005 | Jordison et al. |

FOREIGN PATENT DOCUMENTS

| | | |
|---|---|---|
| EP | 0 769 844 A1 | 4/1997 |
| EP | 1 109 307 A2 | 6/2001 |
| EP | 1 109 308 A2 | 6/2001 |

OTHER PUBLICATIONS

Stephenson, et al., "The Characteristics, Design and Applications of Switched Reluctance Motors and Drives," PCIM '93 Conference & Exhibition, Nürnberg, Germany, Jun. 21-24, 1993, Title page and pp. 1-31, 33-34 and 35-68.
Miller, "Electronic Control of Switched Reluctance Machines," Newnes, Power Engineering Series, Great Britain, 2001, 2 title pages and pp. 92-97.

* cited by examiner

*Primary Examiner*—Karen Masih
(74) *Attorney, Agent, or Firm*—Haynes and Boone, LLP (57) ABSTRACT

A brushless electrical machine has at least one phase winding which produces magnetic flux in the machine. A controller controls the flux in the machine with reference to a demanded flux and a stabilisation signal which, in combination, enable the controller to operate in a stable manner in the presence of disturbances in the inputs or parameters of the controller. The controller is able to operate with either a hardware rotor position detector or with a sensorless position algorithm.

44 Claims, 6 Drawing Sheets

CONTROL OF A BRUSHLESS ELECTRICAL MACHINE

This invention relates to the control of switched brushless electrical machines. The invention particularly, but not exclusively, relates to switched reluctance machines.

The switched reluctance machine is a type of brushless electrical machine. It comprises a rotor, defining rotor poles, a stator, defining stator poles, and a set of windings arranged in relation to the stator poles to define one or more independently energisable phases. In a reluctance machine, energisation of one or more phase windings sets up magnetic flux in a circuit which includes the associated stator poles, urging the rotor into a position of minimum reluctance. Timing the sequential energisation of the windings according to rotor position induces rotor movement. A general treatment of electrical drives which incorporate switched reluctance machines can be found in various textbooks, e.g. "Electronic Control of Switched Reluctance Machines" by TJE Miller, Newnes, 2001 which is incorporated herein by reference. More detail is provided in the paper 'The Characteristics, Design and Applications of Switched Reluctance Motors and Drives' by Stephenson and Blake, presented at the PCIM '93 Conference and Exhibition at Nurnberg, Germany, Jun. 21-24, 1993 which is incorporated herein by reference. As is well known in the art, these machines can be operated as motors or generators by altering the timing of the application of the energisation to the phase windings.

Unlike conventional induction and synchronous 'electromagnetic' machines, e.g., so-called brushless DC machines, in which the current is in stator coils and the field is produced by permanent magnets on the rotor, switched reluctance machines are purely 'magnetic' machines. The torque is produced solely by the magnetic field as the reluctance of the magnetic circuit changes. It follows that the methods of controlling the two types of machine are quite different, since the control is related to the method of torque production. In general, the control methods used for sinusoidally fed conventional machines are inappropriate for switched reluctance machines.

Figure 1:
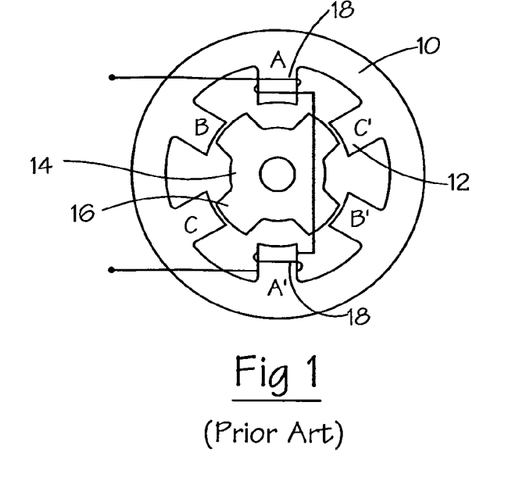
FIG. 1 is a schematic axial cross-section of a switched reluctance machine.

FIG. 1 shows a typical switched reluctance machine in cross section. In this example, the magnetisable stator 10 has six stator poles 12. The magnetisable rotor 14 has four rotor poles 16. Each stator pole carries a coil 18. The coils on diametrically opposite poles are connected in series to provide three phase windings. Only one phase winding is shown, for clarity. The control of the switched reluctance machine can be achieved in a variety of ways well known to the person skilled in the art. If information on the angular position of the rotor is available, e.g. from a position transducer, the excitation can be applied as a function of the position. Such machines are often referred to as "rotor position switched machines".

Figure 2:
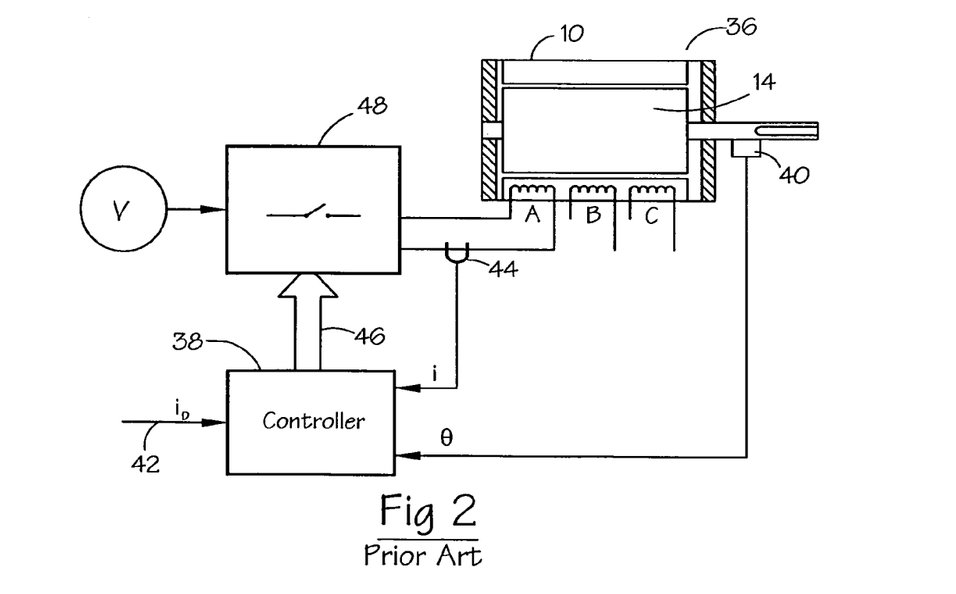
FIG. 2 is a schematic diagram of a closed loop current controller for a switched reluctance machine.

A typical switched reluctance drive is shown in FIG. 2. In this example, the machine 36 corresponds to that shown in FIG. 1. The three phase windings, A, B and C, are switched in turn onto a DC supply V by a set of power electronic switches 48. The moments (i.e., the rotor positions) at which the switches operate are determined by the controller 38, which may be implemented either in hardware or in the software of a processing device such as a microcontroller or digital signal processor. The control signals are sent to the switches via a data bus 46. Closed loop current feedback is provided by sensing the phase currents using a current sensor 44 and feeding back a signal proportional to phase current which is compared to a demanded current $i_D$. The control algorithms often include a proportional (P), proportional-plus-integral (P+I), time optimal, feedback linearised, proportional/integral/derivative (PID) function, or one of many others as is well understood in the art. It is also common for an outer control loop of position or speed to be provided by feeding back a rotor position signal from a position detector 40.

In operation, a signal corresponding to current demand 42 is provided to the controller. This regulates the current in the windings, according to the particular control scheme adopted, to produce the desired output from the machine.

The performance of a switched reluctance machine depends, in part, on the accurate timing of phase energisation with respect to rotor position. Detection of rotor position is conventionally achieved by using a physical rotor position transducer (RPT) 40, shown schematically in FIG. 2, such as a rotating toothed disk mounted on the machine rotor, which co-operates, for example, with an optical or magnetic sensor mounted on the stator. A pulse train indicative of rotor position relative to the stator is generated and supplied to the processing device, allowing accurate phase energisation. Alternative methods of position detection include the so-called "sensorless" methods, in which there is no physical position transducer and the position is deduced from measurements of one or more other parameters of the machine.

Since current in the windings is relatively easy to measure, closed-loop control of the machine is conventionally accomplished by monitoring and controlling the energising current in the windings. However, the desired output of the machine is usually torque, position or speed, and current has a highly non-linear relationship to all of these. The result is that current control techniques generally incur inaccuracies in the output, such as torque ripple, position error and/or speed error. Many current control schemes have been devised to address these shortcomings. All have added complexity.

It has been held by some researchers that the more fundamental control variable in a switched reluctance machine is the flux which is set up in the magnetic circuit in the machine when a phase winding is energised. The flux is directly responsible for the force which acts on the rotor to urge it to a position of minimum reluctance with respect to the energised stator poles. EP-A-1109307 and EP-A-1109308 (both incorporated herein by reference) disclose methods of using flux as the primary control variable. The drive then incorporates a flux controller.

Many different power converter topologies are known, several of which are discussed in the Stephenson paper cited above. One of the most common configurations is shown for a single phase of a polyphase system in FIG. 3, in which the phase winding of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current") which cannot be drawn from, or returned to, the supply. In practical terms, the capacitor 25 may comprise several capacitors connected in series and/or parallel. Where parallel connection is used, some of the elements may be distributed throughout the converter. A polyphase system typically uses several "phase legs" of FIG. 3 connected in parallel to energise the phases of the electrical machine independently.

The phase inductance cycle of a switched reluctance machine is the period of the variation of inductance for the, or each, phase between common points in successive cycles (for example between inductance maxima when the rotor poles and the relevant respective stator poles are fully aligned). As explained in the Stephenson paper cited above, the maximum inductance region, $L_{max}$, is centred around the rotor position where a pair of rotor poles are fully aligned with a pair of stator poles. Similarly, the minimum inductance region, $L_{min}$, corresponds to the position where the interpolar axis on the rotor is aligned with the stator pole axis, as shown in FIG. 1.

At low speeds, switched reluctance systems generally operate in a current-controlled or "chopping" mode. A hysteresis current controller using "hard" chopping is often used, as explained in the Stephenson paper referred to above. An alternative regime is "soft" chopping in which only one switch is opened when the current reaches its upper level. The current then decays much more slowly through the winding, the second switch and one diode. Other types of current controllers are well known in the art, for example those described in EP-A-0769844, which is incorporated herein by reference, off-time controllers, constant frequency controllers, etc., and will not be further described here.

At higher speeds, switched reluctance systems typically operate in the "single-pulse" mode of energisation instead of the chopping mode. This is also explained in the Stephenson paper referred to above.

Thus, systems generally use a chopping mode at low speeds and a single-pulse mode at higher speeds. The upper and lower chopping current levels are normally set to values above the expected peak current of the single pulse mode, so that these parameters do not interfere with single-pulse operation. It is known to set the upper current level to a value which would act as a "safety net" so that if a fault condition developed in the drive, the current would exceed this upper level and cause one or more switching devices to be opened, thereby limiting the current to a safe value.

It is conventional wisdom that there is a limit beyond which further output cannot be obtained in the single-pulse mode and which is reached when the phase flux and current only just reach zero at the end of each electrical cycle. To increase the torque any further under these assumed constraints, one would have to either increase the power supply voltage or reduce the number of turns in the phase windings of the machine, or both. For various reasons these are impracticable or, at best, undesirable.

A further mode of operation is the so-called "continuous current" mode, which makes it possible to produce mechanical output torques and powers greatly in excess of that obtained up to the "limiting condition" in the single pulse mode. It is disclosed in U.S. Pat. No. 5,469,039 (Stephenson), and incorporated herein by reference. This patent discloses a method of operating in a stable manner in this mode so that steady state operation is possible. The phase windings therefore operate with current continuously flowing through them, unlike in the chopping and single pulse modes, and are always linked by flux. The current variation is quasi-sinusoidal above a "standing" value. This has become an important mode for systems which have to produce high levels of overload output at some points of their operating cycle. Although the efficiency of the drive falls in this mode, it allows specifications to be achieved which might otherwise require a larger machine or increased volt-ampere (VA) capacity in the power switching devices.

While motoring operation has been illustrated in the above discussions, it is well-known that switched reluctance machines operate equally well in the generating mode, in which the current waveforms are generally mirror images of the motoring waveforms.

The parameters of angles and currents for controlling the machine in the different modes are generally functions of speed and are either computed in real time or, more commonly, stored in some form of data table from which they can be read at appropriate times. The parameter values are carefully chosen in order to achieve smooth output from the machine as the speed changes. If the stored values are relatively sparse, some form of interpolation is used to give suitable parameter values at intermediate speeds. There is a particular difficulty in choosing values at the transition points between chopping and single-pulse modes, and between single-pulse and continuous current modes, where a smooth transition is desired regardless of the torque level demanded.

One solution to this problem at the transition of the chopping and single-pulse modes is to use the current control parameters as the main variable. The current level is generally held constant with speed for a given torque demand throughout the chopping range. However, as the speed rises to the single-pulse mode region it is known to raise the upper current level gradually (and sometimes the lower current level by corresponding amounts) so that the mode gradually changes from chopping to single pulse. Once the machine has reached a speed where the phase current never reaches the upper current level, the current control parameters are generally set to a high value so that they do not cause chopping for the rest of the single-pulse speed range.

The problem of sensitivity to control angles in, and at the entry to, the continuous current mode remains. Rapid changes in control become difficult to achieve and risk the system becoming unstable, for reasons which will now be described.

The effect of the "dead time" that occurs between cycles of flux and current during conventional operation is that flux and current always start from zero at the beginning of each electrical cycle. When operating in continuous current mode, the steady state flux, current and torque are determined by the time integral of the net applied winding voltage over all previous electrical cycles and not just the present cycle, as is the case in conventional "single pulse" mode. As a result, the machine output in the continuous current mode is highly sensitive to very small changes in the control angles. This creates difficulty in linearising the torque output against a torque demand signal and also leads to very high levels of sensitivity to winding resistance and voltage drops in the semiconductor switches. Since the winding resistance in particular is a strong function of temperature, attempting to control torque in the continuous current mode by control angles alone will often result in unacceptable changes in output as the machine temperature changes, e.g., due to load or ambient variations.

This problem of sensitivity to switching angles can be ameliorated by using the aforementioned controller to control both the peak current and the flux. In this case, the conduction angles are made slightly wider than would otherwise be needed under worst-case conditions (e.g. at the highest required winding temperature). The chopping action of the current controller then automatically provides stabilisation of the operating point—in the steady state usually just one "chop" is required to clip the peak current and control flux, so that excessive switching losses in the power electronics are not an issue. This approach has been described in U.S. Pat. No. 6,972,533, which is incorporated herein by reference.

A major difficulty remains, however. The use of current control to regulate torque in the continuous current mode does not address the difficulty of achieving a smooth transition into and out of the mode. The exact point at which the onset of continuous current occurs will be depend not only on winding temperature, but will also be sensitive to the supply voltage and to variations from one particular machine sample to another. A single control parameter "map" can effect a smooth transition only at one supply voltage and winding temperature; the difficulties of compensating for both voltage and winding temperature will be self-evident, especially when considering the high sensitivity of machine output to parameter variations whilst operating in the continuous current mode.

According to disclosed embodiments there is provided a controller for a brushless electrical machine having at least one phase winding, the controller comprising control means operable to produce a control signal for energisation of the phase winding in response to an input signal, and being operable to modify the input signal using a flux stabilisation signal, thereby altering the flux produced by the phase winding to stabilise the output of the machine. Also disclosed is an equivalent method. The input signal is modified by the flux stabilisation signal thereby influencing the output of the control means to alter the flux of the machine.

Some of the embodiments disclosed can be used in relation to sensorless forms of rotor position detection. Other embodiments can be used in relation to rotor position detector hardware. In various embodiments, the flux stabilisation signal is used to influence the moment at which the flux decay in a machine phase winding is initiated by modifying the input signal to the control means according to the moment at which the flux in the phase is arranged to decay.

In one form the flux stabilisation signal has a sawtooth waveform typically with a linear gradient. This can have a negative slope and is combined with a flux demand signal and compared with a flux feedback signal which is indicative of the instantaneous flux in the machine itself. Alternatively, the sawtooth waveform of the flux stabilisation signal can have a positive slope and is combined with the flux feedback signal instead. This combined signal is compared with the flux demand signal. In either case, the effect of the stabilisation signal is to cause a transition from rising flux to falling flux. Even in the presence of any disturbance there is an adequate period (both angular and temporal) for the flux to be stably controlled before the end of the period of energisation of the phase. In general, the stability signal is adapted to maintain the rise and fall of flux to be substantially equal over the electrical cycle.

The combination of the flux stabilisation signal and the flux feedback signal or flux demand signal can be derived by adding them together in an adder.

The controller may include means for generating the flux stabilisation signal as a time variable signal which has a period that is coincident with the period of repetition of energisation of the phase winding.

The gradient of the sawtooth waveform of the stabilisation signal can vary with the speed of the machine. For example, the gradient can be increased as the speed increases and the period of time of the electrical cycle is shortened. However, in some embodiments the peak amplitude of the sawtooth waveform may remain the same regardless of machine speed.

In other embodiments the stabilisation signal is used to modify a signal indicative of flux growth in the phase winding. In this form the rate of growth of flux, as indicated by a flux feedback signal, is modified such that the apparent rate of flux growth increases. By extrapolating according to the modified flux feedback signal, the input signal is modified thereby enabling the switch-off point to be determined.

Another embodiment disclosed is a controller for a switched reluctance machine having a rotor, a stator with at least one phase winding and switch means for energising the at least one phase winding, the controller being operable to generate actuation signals for actuating the switch means, the controller including first switch control means for producing switch-off signals for controlling the switch means when the flux in the at least one phase winding exceeds a flux demand signal and second switch control means for producing actuation signals for controlling the switch means according to the position of the rotor relative to the stator.

This controller may comprise a comparator arranged to receive a first flux signal indicative of the flux in the at least one phase winding and a second flux signal indicative of the demanded flux, and to produce a switch-off signal when the first flux signal exceeds the second flux signal.

The second switch control means may be operable to produce a switch-on signal when the rotor reaches a predetermined position relative to the stator, whereby the flux in the phase winding is increased.

The second switch control means may also be operable to produce a freewheel signal for freewheeling the current in the at least one phase winding when the rotor reaches a freewheel position relative to the stator, whereby flux in the phase winding is allowed to decay.

The second switch control means may also be operable to produce a switch-off signal when the rotor reaches a switch-off position relative to the stator, whereby the flux in the phase winding is driven down.

The invention can be applied to various brushless electrical machines, such as switched reluctance machines or brushless DC machines.

The present invention can be put into practice in various ways, some of which will now be described by way of example with reference to the accompanying drawings in which:—

Figure 3:
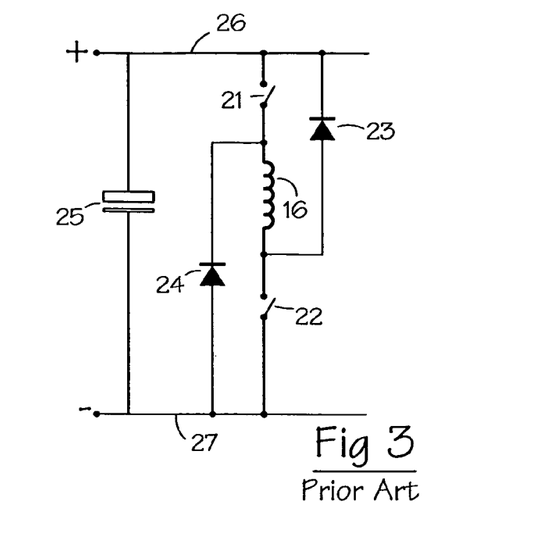
FIG. 3 is a power converter circuit for a switched reluctance machine.
Figure 4:
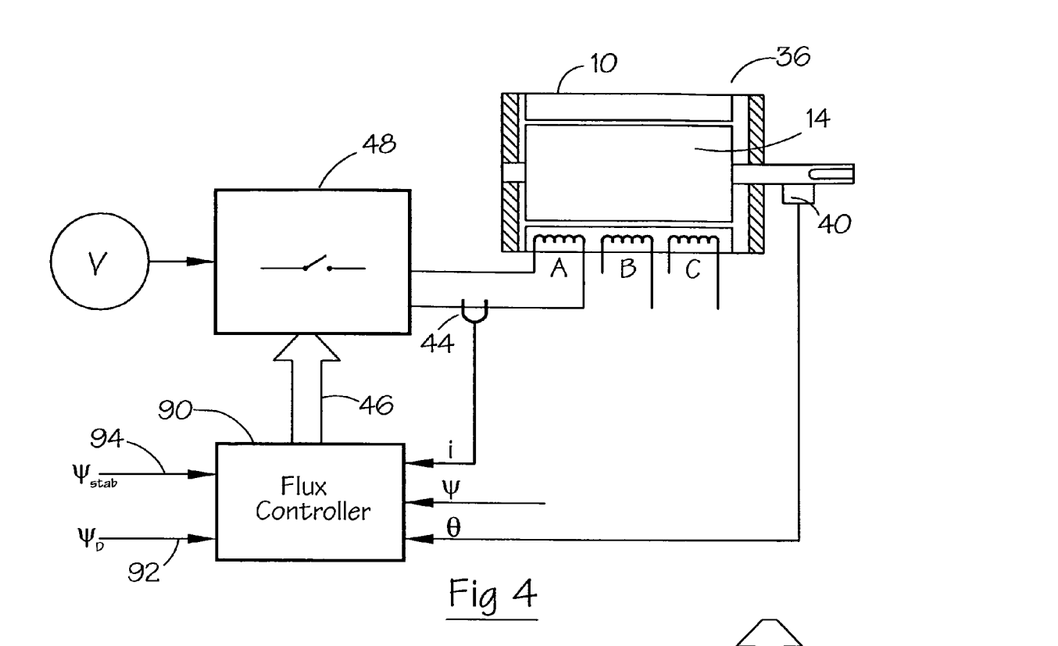
FIG. 4 is a schematic block diagram of a switched reluctance drive system incorporating an embodiment described herein.

Referring to FIG. 4, a first embodiment of a switched reluctance drive system includes a switched reluctance machine 36 having a laminated magnetisable stator 10, carrying phase windings A, B, C, and a laminated magnetisable rotor 14. Each is constructed in this embodiment of laminations of a suitable steel known to the person of ordinary skill in the art. A rotor position transducer (RPT) 40 is arranged in relation to the rotor 14 to monitor position. As mentioned above, the RPT can take various forms in which the movement of a first element past a sensing device causes an output indicative of relative movement of the rotor relative to the stator. A flux controller 90 produces control signals for actuating power electronic switches 48 configured, for example, in phase legs as shown in FIG. 3, for controlling the energisation of the phase windings A, B and C associated with the stator 10. The schematically illustrated connection of only one phase winding is shown for the sake of clarity, but each phase is independently energisable by actuation of the switches. In an alternative embodiment, the energisation for the windings is provided by an amplifier of known type.

The flux controller 90 is provided with three feedback signals. Firstly, it receives rotor position signals θ from the RPT 40. In alternative embodiments, the rotor position signals are provided by an algorithm which deduces the rotor position from other parameters of the machine. In either case, the signal θ provides positional (and hence timing) information to the flux controller 90. Secondly, the flux controller 90 receives phase current signals i from a current transducer 44. It will be appreciated that each phase winding will typically have associated with it a current transducer 44 to produce the current signals i, but only one transducer is shown here for the sake of clarity. It should be noted that the current feedback signal is not used in the manner of a conventional current controller: rather, it is used to provide overall monitoring of current to ensure that it stays within a predetermined safe level. Thirdly, the flux controller 90 receives flux signals ψ proportional to the flux in each phase winding. These signals are derived either by direct measurement of the flux or by one of the several methods of flux estimation known to the person of ordinary skill in the art.

The input 92 to the flux controller 90 is a demand signal representing the desired peak flux $\psi_D$ in the machine to produce a desired output. In operating the machine as a motor, the desired output is torque, speed or position. In operating the machine as a generator, the desired output is typically electrical power. In addition, the flux controller 90 has a further flux stabilisation input 94, which is described in more detail below. The flux controller 90 produces control signals, which are passed through the data bus 46 to the power electronic switches 48 that control energisation of the phase windings from the voltage source V.

Figure 5:
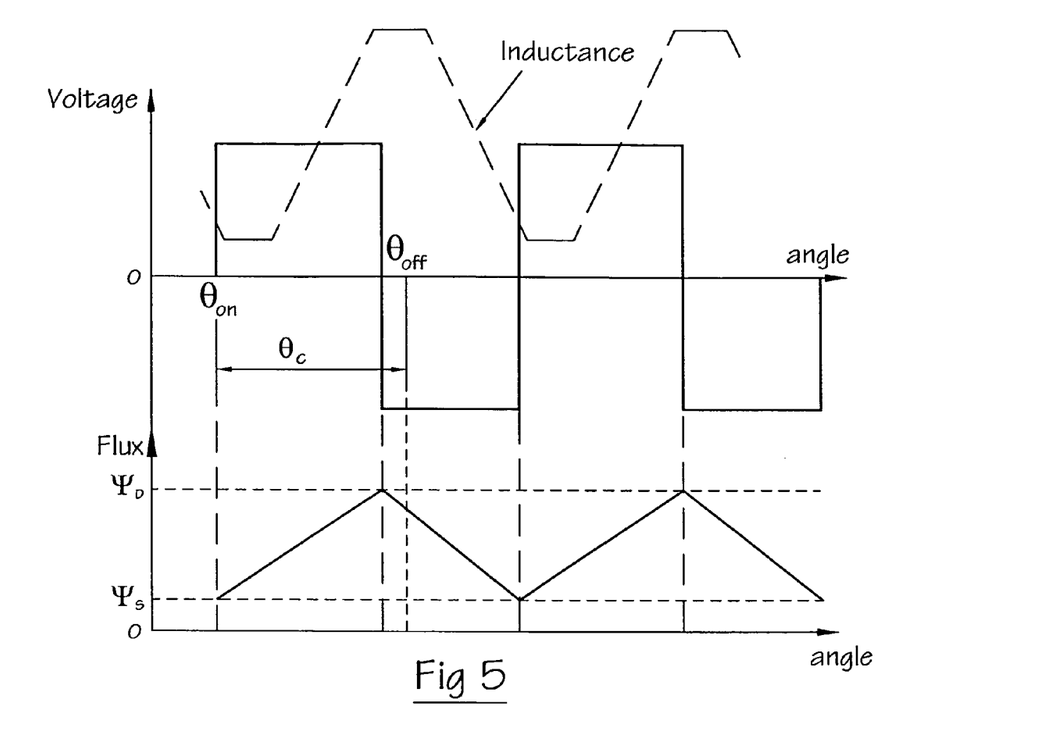
FIG. 5 shows voltage and flux waveforms for a machine operating in continuous current mode.

The flux-related inputs provide a means of terminating a phase voltage pulse should the phase flux reach a limiting value before the rotor reaches the end of the conduction period at which the phase switches would normally be opened in a single-pulse mode, or before the phase current reaches a predetermined value in a chopping mode. This is illustrated in FIG. 5, which shows the waveforms for the machine operating in continuous current mode. The demanded peak flux level $\Psi_D$ reduces the anticipated conduction angle $\theta_c$, so that the flux cycles between the values of $\Psi_D$ and a standing value $\Psi_S$. The value $\Psi_S$ is not directly controlled but arises naturally as a consequence of the demanded peak flux $\Psi_D$, the machine speed and the rate of rise and fall of the flux (which in turn is determined by the supply voltage and the number of turns in the phase winding).

It has been appreciated by the inventors that, in general, the developed torque is largely independent of the winding resistance in the single pulse mode. As the machine experiences changes in load, the winding temperature (and hence winding resistance) changes but, for most systems, the output of the machine is essentially independent, thus allowing the use of control parameters which are unaffected by winding resistance. However, a difficulty encountered in the more volatile continuous current mode is the very high incremental torque which is obtained for a given increase in conduction angle. Whilst the flux and current will eventually settle at a controlled steady-state value, a small increment in conduction angle will give rise to a very large change in standing flux, current and average torque. This is particularly so if the phase winding resistance is small. In a practical drive system this is likely to cause-problems of torque control resolution when attempting to use only commutation angles to regulate torque in the continuous current mode.

Even if acceptable torque resolution can be maintained, system-level controls (such as a speed regulator) must be able to cope with the sudden increase in torque "gain" of the machine at the point of entry into the continuous current mode from the single pulse mode. Furthermore, the steady state values of average flux, current and, therefore, torque are now critically dependent upon the phase winding resistance and also on the voltage drops within the semiconductor switches. All these parameters exhibit strong temperature dependence. This means that not only is the actual torque developed in the continuous current mode strongly sensitive to component temperature, but also the exact conduction angle required to reach the mode will be temperature dependent. This latter point especially makes it very difficult to linearise the torque-control discontinuity using conventional control angle "look-up" tables, or other fixed means of determining commutation angle (e.g. polynomial functions).

Figure 6:
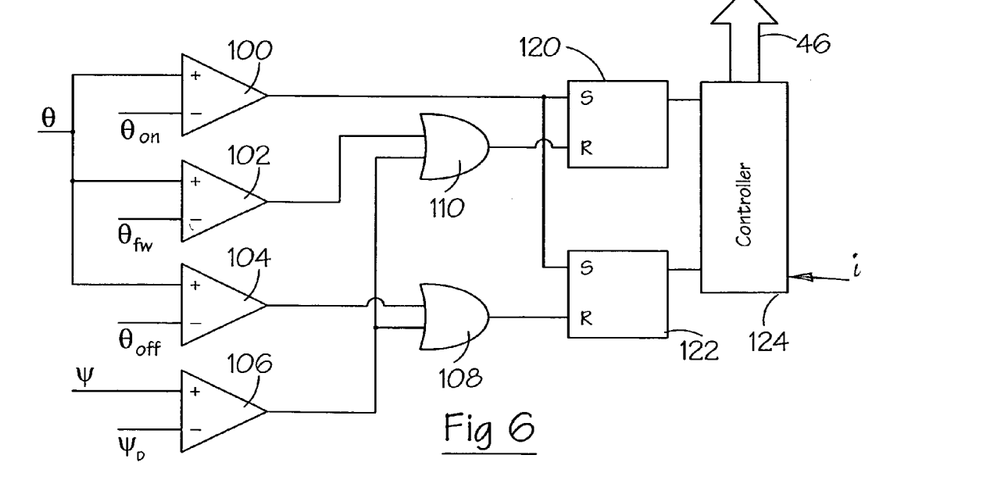
FIG. 6 shows a logic diagram for part of the drive system of FIG. 4.

An exemplary embodiment of a commutator for an SR machine which overcomes the problems outlined above is shown in FIG. 6. This forms part of the controller 90 in FIG. 4 producing the switch control outputs on bus 46. The output θ from the RPT 40 (see FIG. 4) is compared with the predetermined values of angle for switch-on $\theta_{on}$, freewheel $\theta_{fw}$ and switch-off $\theta_{off}$ in respective comparators 100, 102 and 104. The flux feedback signal Ψ (which may be a derivation of direct feedback or an estimate of flux) is compared with the demanded flux $\Psi_D$ in a further comparator 106.

The output of the flux comparator 106 together with the output of the switch-off comparator 104 are applied to an OR gate 108. The output of the flux comparator 106 together with the output of the freewheel comparator 102 are applied to an OR gate 110. The output of the switch-on comparator 100 provides the SET input to a first set/reset (SR) latch 120. The RESET input to the first latch 120 is the output of the OR gate 110. The output of the switch-on comparator 100 also provides the SET input to a second set/reset (SR) latch 122. The RESET input to the second latch 122 is the output of the OR Gate 108. The outputs from the latches are the inputs to a controller 124 which monitors the current in the phase winding level and derives the control signals for bus 46 to supply to the power electronic switches 48 in FIG. 4. As mentioned above the controller is part of the flux controller 90. As such it is either constituted by a sub-routine in a single processing device or is a separate processing device. In either case it is, for example, a microprocessor or a digital signal processor running software to execute the recognised steps for implementing the control technique described herein. The controller includes features which monitor the current and take appropriate action if the current exceeds predetermined thresholds.

The circuit of FIG. 6 can be operated as follows. When the rotor angle θ reaches switch-on angle $\theta_{on}$ both the SR latches 120, 122 are "set". This activates the phase switching devices (subject to the overall consent of the subsequent controller 124). After the start of conduction at $\theta_{on}$, the phase flux Ψ builds from $\Psi_S$, with an approximately linear rise of flux with time. If the rotor position estimate (or measurement) reaches the freewheel angle $\theta_{fw}$ or the turn-off angle $\theta_{off}$ before the phase flux reaches the limiting value $\Psi_D$, the output of comparator 102 or 104 changes state.

One or both SR latches are then cleared or "reset" by an output from one or both OR gates 108 and 110 to the R inputs to the latches 120/122. This opens one or both the phase switches 21/22 (FIG. 3) according to the condition i.e. freewheeling or turn-off. The phase current and flux will then decay slowly (if the freewheel angle has been reached and only one of the switches 21/22 has been opened) or rapidly (if the off-angle has been reached and both switches are opened). The values of $\theta_{on}$, $\theta_{off}$ and $\theta_{fw}$ are set as thresholds, either calculated in real time or stored in a memory of some known form. This is angle-based commutation.

As illustrated, in FIG. 5, however, the phase flux may reach the flux limit TD before the off-angle is reached. At this point, both latches will be reset immediately, so forcing down the phase flux regardless of the anticipated conduction angle. The machine is now being controlled as a function of its peak flux. An alternative scheme opens just one of the phase switches 21/22 when the flux limit is reached—this would initiate freewheeling, and the phase flux would then fall only slowly until the off-angle is reached.

The system of FIG. 6 is able to operate in either of the single pulse or continuous current modes according to the inputs to the comparators 100-106. In each mode, the system can operate as a conventional chopping current controller, an angle controller or a peak flux controller. All these modes of operation of the controller 90 are beneficial because, particularly in the continuous current mode, the torque produced is smoothly and progressively controlled by $\Psi_D$ and is not sensitive to winding resistance, supply voltage or the exact value of the control angles. It also provides a means for a smooth and continuous transition between the single-pulse and continuous current modes even when there are variations in the operating conditions of the machine.

However, optimal operation of the controller described above relies on the absence of disturbances in the input and feedback parameters to which operation in the continuous current mode is particularly prone. Such disturbances can arise from a number of sources. In drives operating in electrically hostile environments, electrical noise may be present in, for example, the current or flux measurement. In a drive with low inertia, the rotor may be changing speed or direction quickly. In drives with "sensorless" rotor position detection, the estimates may suffer from random errors, leading to jitter in the control angles being supplied to the controller. Drives which use digital circuitry in the control system may suffer from quantisation effects. Any, or a combination, of these factors may lead to instability in the flux controller.

Figure 7:
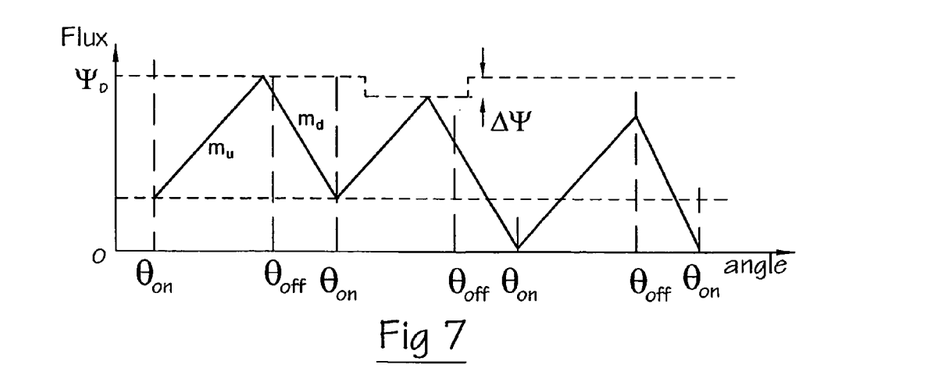
FIG. 7 shows a flux diagram for unstable operation in continuous current mode.

An example of such instability is shown in FIG. 7. This illustrates the flux reaching $\Psi_D$ before $\theta_{off}$ is reached, so the first cycle of flux has been controlled by the flux demand parameter $\Psi_D$. However, a transient disturbance $\Delta\Psi$ occurs in $\Psi_D$ during the second cycle, causing an early termination of the rising flux. Although the flux demand is restored to its intended value, the subsequent cycles of flux become unstable, leading to erratic output of the machine. In general, very small values of disturbance are sufficient to cause instability, since the error introduced by the disturbance will not decay of its own accord.

The gradients of the (linearised) flux waveform are designated $m_u$ and $m_d$ respectively as shown in FIG. 7. The units of the gradients are Webers/degree or, if the diagram were drawn in the time domain, Webers/sec. The units are interchangeable because the machine is taken to be rotating at constant speed. The numerical value of $m_u$ is positive and that of $m_d$ is negative. By using linear algebra it can be shown that if a disturbance $\Delta\Psi$ is introduced into the flux waveform, this disturbance will decay on a cycle-by-cycle basis only if $m_u > |m_d|$. If this condition is not met then any error introduced in the waveform will grow cycle-by-cycle, resulting in chaotic sub-harmonic oscillation of the flux waveform. Those skilled in the art will realise that the disturbance could equally well have occurred in the measured flux or in the control angles. However, regardless of the source of the disturbance, the gradients of the flux are fixed by the machine design and the supply voltage.

Figure 8:
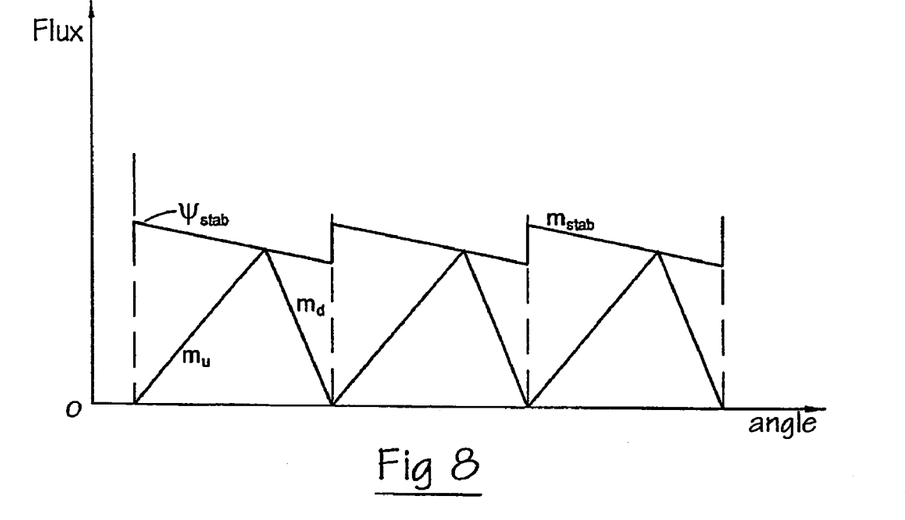
FIG. 8 shows a flux waveform according to embodiments described herein.

The problem of instability is addressed in this embodiment by adding a stabilisation signal in the form of a negative-going ramp, synchronised to the period of the rpt signal, as shown in FIG. 8. The gradient of the ramp $m_{stab}$ also has units of Weber/degree in the angle domain and its numerical value is negative. It can be shown, by linear algebra, that the error in the waveform will decay to zero provided that $$m_u - m_{stab} > |m_d|$$

i.e., $$m_u - m_{stab} + m_d > 0$$

Figure 9:
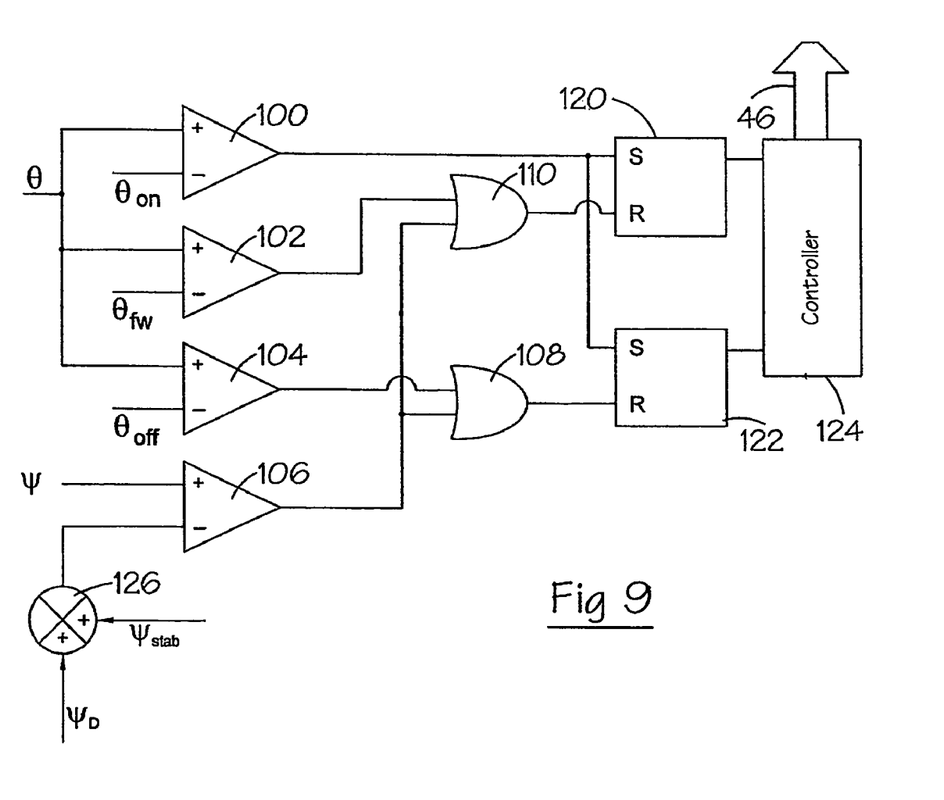
FIG. 9 shows a logic diagram implementing one aspect disclosed herein.

FIG. 9 shows how this may be implemented in the flux controller of FIG. 6 and like reference numerals have been used for like parts. The controller 124 of FIG. 9 has the inputs to the flux controller 90 in FIG. 4. The flux demand signal $\Psi_D$ is supplied to an adder 126 where it is combined with the flux stabilisation signal $\Psi_{stab}$ which is in the form of the negative-going saw-tooth waveform shown in FIG. 8 and which repeats coincident with each conduction cycle. The effect of combining the two signals is to give a peak flux demand which is time (i.e., rotor position) dependent and now automatically takes into account the effects of signal disturbances and/or parameter variations which otherwise alter the balance between the rising and falling parts of the flux waveform in each electrical cycle. The addition of this flux stabilising signal produces a stable system.

It will be appreciated that the flux stabilisation signal $\Psi_{stab}$ could equivalently be applied to the other terminal of the flux comparator 106, i.e. added to the flux feedback instead of to the demand reference. In this case a positive-going ramp for the flux stabilisation waveform $m_{stab}$ would be required to achieve the same effect. Other combinations using a combination of a suitable ramp waveform (negative or positive-going) are of course possible, again with equivalent results. While the flux stabilisation signal is referred to above as a linear sawtooth waveform, other forms of flux stabilisation signal are possible within each electrical cycle. For example, the gradient of the flux stabilisation signal may equally well be exponential or some other non-linear function. The choice of the waveform will depend on the application.

In large and/or high voltage SR machines, the resistive and semi-conductor voltage drops will typically be relatively small compared with the DC link voltage. The gradient $m_d$ of the flux will be only very slightly steeper than the gradient $m_u$ of the flux due to the high value of the voltage (which is the determining factor in the rate of flux change per unit time). Thus, in such a situation only a relatively small amount of stabilisation is needed to stabilise the machine by ensuring the combined gradient $(m_u - m_{stab})$ is steeper than that of $m_d$. In effect, this causes the rate of rise of measured flux to be greater than the fall. The result of adding the flux stabilisation signal is to cause the measured flux to reach its threshold relatively early, thereby leaving time for the decaying flux to fall sufficiently. In this way, the influence of the flux stabilisation signal is to maintain the rise and fall of flux produced by the phase winding over an electrical cycle to be substantially equal by ensuring that any error introduced into the waveforms will decay cycle by cycle.

Another consideration is speed variation, as it will be clear that the period of a conduction cycle decreases with increasing speed. In order to maintain the effect of stabilisation, $m_{stab}$ needs to be an appropriate function of speed.

The degree of stabilisation required for a given machine is not directly tied to the level of flux demanded unless the machine's per-unit resistance is high, thereby causing a larger difference between $m_u$ and $m_d$. As a practical matter, the low resistance of typical machines means the gradients $m_u$ and $m_d$ will each vary by only small amounts as the load on the machine increases so that effectively the gradients $m_u$ and $m_d$ will be substantially constant regardless of load. However, ripple in the dc link voltage may, in some cases, introduce an uncertainty that needs to be addressed by the stabilisation, i.e. the stabilisation needs to be increased to cater for perturbations in $m_u$ and $m_d$ due to ripple.

By way of example, consider a switched reluctance machine having a DC link voltage of 750V, a voltage drop across the power semi-conductor switches of the controller of 3V, a diode voltage drop of 1.7V and a winding resistance (iR) voltage drop of 5V.

To drive the flux up in an electrical cycle the available voltage is:

750−(2×3)−5=739V that is, the supply voltage less the voltage drops across both actuated switches and the winding.

To drive the flux down in electrical cycle, the available voltage is:

750+(2×1.7)+5=758.4V that is, the supply voltage boosted by the voltage induced in the circuit across the recirculating diodes and the winding.

Then the maximum rate of rise of flux is 739/60=12.32 Webers per sec.

the maximum rate of fall of flux is 758.4/60=12.64 Webers per sec.

Thus, the stabilisation needs an amplitude sufficient to boost the apparent rate of rise of flux by the difference between these two figures, namely 0.32 Webers per second.

Using, for the purposes of illustration, a machine running at 500 rpm and having an eight-pole rotor, the electrical period of the conduction cycle is 1.5 msec. From this, the amplitude of $m_{stab}$ needs to be at least 0.32×0.015=0.48 mWebers—which is 2% of the reference value. It may be necessary to include a further amount in the amplitude to cater for other perturbations in the system, such as ripple voltage, as discussed above.

In a practical situation, the speed range over which continuous current mode operation is required is often quite limited. Thus, one possibility is to use a fixed initial amplitude of stabilisation across the speed range. At higher speeds the dynamic response of the machine will be adversely affected in theory, but this is unlikely to be to an unacceptable degree in many applications.

The most difficult area for stabilisation occurs at maximum phase current where the ohmic voltage drop across the winding is at its greatest and the resultant flux waveform becomes non-linear. The ideal solution for a non-linear flux rise and fall is to have a stabilisation curve that still has a period coincident with the period of repetition of energisation of the phase winding (as above) but has a non-linear profile suited to the flux waveforms. This can be implemented if required, at the expense of more complex circuitry and/or algorithms.

The nature of the flux stabilisation signal may vary dynamically as operating conditions for the machine change.

It should also be noted that the flux control scheme discussed above, whilst particularly advantageous for the control of the continuous current mode, is not constrained to use solely in that mode: it is equally applicable to discontinuous flux operation at lower torques and speeds.

When it is employed for control of the continuous current mode, it has been found beneficial to bring the flux limit into play progressively before the onset of the continuous current mode, so that there is a seamless transition between discontinuous and continuous current/flux modes.

In general, the disclosed embodiment uses a flux stabilisation signal which is cyclical coincident with the conduction cycle of the machine. The flux waveform is superimposed on the value of the flux demand signal or the measured flux signal so that the effective value at which the flux growth in a phase changes to falling flux falls over the phase condition cycle. In effect, any disturbance in the system which would otherwise give rise to progressive flux growth or erratic output is compensated by the changing value at which rising flux changes to falling flux such that an adequate part of the conduction cycle (and therefore a greater period of time) is available for the flux to be stably controlled by actuation of the switches.

Figure 10:
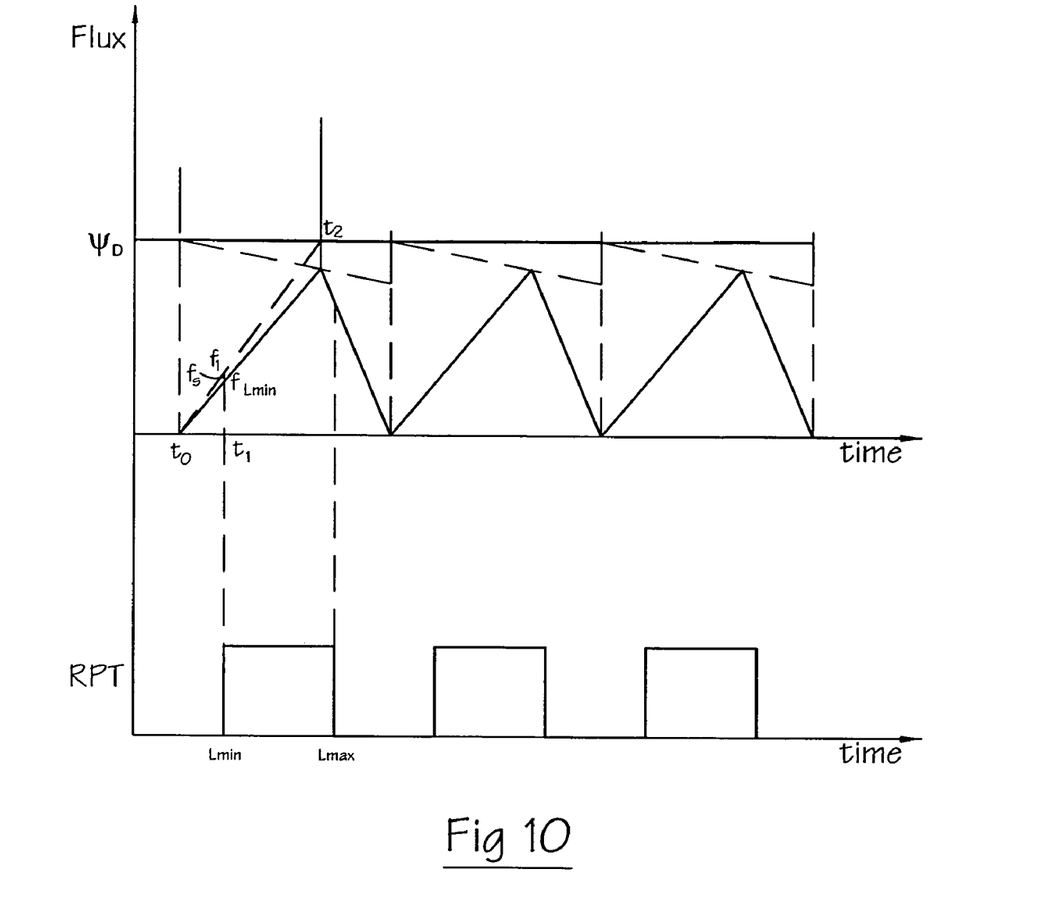
FIG. 10 shows waveforms for a second embodiment.

The embodiment illustrated in FIGS. 8 and 9 makes use of a continuously available measurement or estimate of flux. In many systems which are operating with sensorless position detection, this signal is already present and so can be used for the further purpose of flux stabilisation. If, however, the system is deriving position information from a physical position transducer as described above, a flux signal may not be available and would need to be generated specifically for flux stabilisation. Typically, this would be done by integrating the phase voltage, which requires significant processing capability to yield a reliable signal. Another embodiment is shown in FIG. 10 as would be implemented in the controller 90 of FIG. 4 when arranged to control the machine 10 according to signals from a physical rotor position transducer. This avoids the need for continuous flux information with a consequent reduction in the required processing power.

Figure 11:
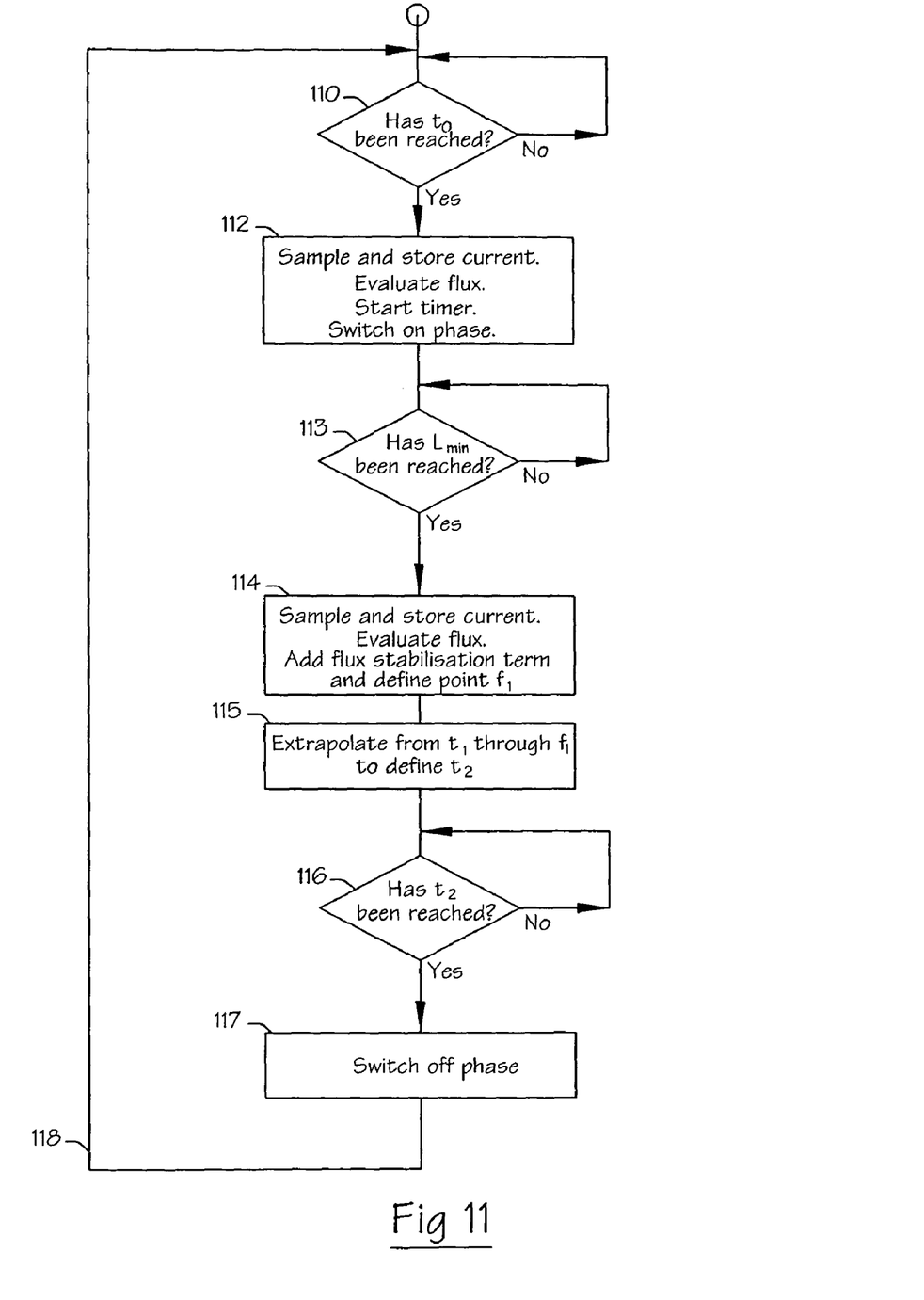
FIG. 11 is a flow diagram for implementing the embodiment of FIG. 10.

Rather than using a continuous derivation of the phase flux, this embodiment provides a snapshot of the flux at a particular moment and then extrapolates to find the appropriate turn-off time. In FIG. 10 it is assumed that a signal from a rotor position transducer (or some functional equivalent) is available to allow the phase winding to be energised at $t_o$. The current can be recorded and its value stored, the value being zero if the machine is in single-pulse mode and non-zero if the machine is in the continuous current mode. From a knowledge of this current and the turn-on point $t_o$, the flux can be determined from the magnetic characteristics of the machine. This value of flux is stored. A timer is set to run from to and the sequence of steps as would be carried out according to this embodiment are shown in FIG. 11.

When $L_{min}$ is reached (as signalled by the rotor position transducer), the current is again measured and the flux evaluated. Since the current at $L_{min}$ is virtually linear with flux, a simple calculation can be used if desired, rather than using a look-up table of magnetic characteristics. This establishes the flux value $f_{Lmin}$. To this value, the flux stabilisation value $f_s$ is added to give the point $f_1$. By extrapolating from $t_0$ through the point $f_1$, the intersection with the flux demand is determined at $t_2$, which is taken as the turn-off point for the phase.

While this embodiment uses the convenient position of $L_{min}$, any other predetermined position of the rotor could be used to equal effect. For example, as a practical matter it is sometimes necessary to 'skew' the RPT by advancing or retarding it to take account of operating or machine characteristics. Thus, for example an RPT output may not actually be coincident with an event such as $L_{min}$. This would still be a convenient predetermined position rotor position for the purposes of this invention.

In situations where the flux growth is linear (i.e. the iR drop of the winding is small, as is typically the case for large and high-voltage machines), linear extrapolation is adequate. For other cases, a suitable non-linear interpolation routine could be employed, e.g. quadratic interpolation.

FIG. 10 shows this method superimposed on the method shown in FIG. 8 and demonstrates the equivalence of the two embodiments. In this embodiment, the stabilisation term is added to the calculated flux, rather than subtracted from the flux demand signal. As noted above, the benefit of this embodiment is the elimination of the need for a continuous integration of the applied phase voltage to produce a flux estimate. Only one timer together with simple storage and calculation processes are required.

FIG. 11 shows an exemplary flowchart to implement the processes of this embodiment. It will be appreciated that, unless otherwise stated, the process is performed in the suitably programmed controller like that labelled 90 in FIG. 4 to which signals from a hardware rotor position transducer (RPT) are supplied in an essentially conventional manner. The process starts at step 110 by testing to see if the phase energisation point $t_0$ has been reached according to the signals from the RPT. If not, control loops around to the start of the process. If it has, step 112 samples the current already in the phase, if any, using a current transducer 44 as shown in FIG. 4. That value, and the rotor angle corresponding to $t_0$, is then used to evaluate the flux. A timer function in the controller is started and the phase is energised by connecting it to the voltage supply by the switches in the power converter 48. At step 113 a test is set up to determine when the rotor position transducer (or equivalent) signals that the minimum inductance position $L_{min}$ has been reached. When it has, the current is again sampled and stored and the flux evaluated at step 114. The flux stabilisation term is also added to the calculated flux to give the value of flux $f_1$.

Step 115 takes the value of flux at to and the value $f_1$ and extrapolates according to the chosen extrapolation method to find the time $t_2$ at which the flux is expected to reach the demanded flux level. The timer continues to run and step 116 determines when the timer reaches $t_2$. Step 117 switches off the phase so that the flux, and hence current, decay towards zero. Control is looped around to begin the next cycle at 118.

The invention in its various embodiments provides a flux control technique for electronically switched brushless machines of various types, and is particularly suited to switched reluctance machines. It produces a real-time signal of the flux in the magnetic circuit of the machine with which a reference value of flux can be compared to control the machine output in a stable manner in the presence of electrical noise and other disturbances. The disclosed embodiments illustrate a significant benefit, in that the additional control scheme can be incorporated into an existing SR control system with minimal modification, and without having to re-define existing sets of control data, which remain valid outside of the continuous current mode. The benefits of flux control discussed above are now available, with the additional benefit that there are still only two commutation events per electrical cycle (one switch-on event and one switch-off)—as is the case with conventional angle control. It will be apparent to the skilled person that various modifications and changes can be made to the specifically disclosed embodiments without departing from the invention. The invention is to be limited only by the scope of the following claims.

What is claimed is:

1. A controller for a brushless electrical machine having at least one phase winding, the controller comprising control means operable to produce a control signal for energisation of the phase winding in response to an input signal, and being operable to modify the input signal using a flux stabilisation signal, thereby altering the flux produced by the phase winding to stabilise the output of the machine.

2. A controller as claimed in claim 1 in which the flux stabilisation signal is arranged to influence the moment at which flux decay in the phase winding is initiated according to the input signal.

3. A controller as claimed in claim 1, including means for generating the flux stabilisation signal as a variable signal which has a period that is coincident with the period of repetition of energisation of the phase winding.

4. A controller as claimed in claim 3 in which the flux stabilisation signal is variable with time.

5. A controller as claimed in claim 3 in which the flux stabilisation signal is variable with rotor angle.

6. A controller as claimed in claim 3 in which the means for generating the flux stabilisation signal are operable to produce a sawtooth waveform.

7. A controller as claimed in claim 6 in which the sawtooth waveform defines a varying threshold input signal at which flux decay is initiated.

8. A controller as claimed in claim 1, including means for receiving a flux feedback signal, a flux demand signal and the flux stabilisation signal to produce the input signal.

9. A controller as claimed in claim 8 in which the means for receiving include a comparator arranged to receive the flux feedback signal as a first input and a combination of the flux demand signal and the flux stabilisation signal as a second input.

10. A controller as claimed in claim 8 in which the means for receiving include a comparator arranged to receive the flux demand signal as a first input and a combination of the flux feedback signal and the flux stabilisation signal as a second input.

11. A controller as claimed in claim 9, in which the means for generating the flux stabilisation signal are operable to produce a sawtooth waveform, and in which the gradient of the sawtooth waveform is negative.

12. A controller as claimed in claim 10, in which the means for generating the flux stabilisation signal are operable to produce a sawtooth waveform, and in which the gradient of the sawtooth waveform is positive.

13. A controller as claimed in claim 12 in which the gradient is constant value throughout the cycle.

14. A controller as claimed in claim 1 in which the flux stabilisation signal is adapted to maintain the amplitudes of the rise and fall of the flux produced by the phase winding over an electrical cycle to be substantially equal.

15. A controller as claimed in claim 1, including means for determining when a point in a phase energisation cycle is reached and to initiate timing to a predetermined rotor position, means for deriving the input signal from a signal indicative of the flux for the phase winding at the said position; means for adding the flux stabilisation signal to the input signal, and means for extrapolating from the modified input signal to a predetermined threshold of flux demand to determine a moment at which flux decay in the phase winding is initiated.

16. A brushless electrical machine system comprising a brushless electrical machine, a controller as claimed in claim 1 and switch means operably connected with the phase winding and responsive to the control signal to energise the phase.

17. A system as claimed in claim 16, in which the means for generating the flux stabilisation signal are operable to produce a sawtooth waveform, and in which the gradient of the sawtooth waveform is variable according to the speed of the machine.

18. A system as claimed in claim 16, in which the means for generating the flux stabilisation signal are operable to produce a sawtooth waveform, and in which the sawtooth waveform has a fixed peak amplitude that does not vary with the speed of the machine.

19. A system as claimed in claim 16 in which the electrical machine is a reluctance machine or a brushless DC machine.

20. A method of stabilising the output of a brushless electrical machine having at least one phase winding, the method comprising:
producing a control signal for energising the phase winding in response to an input signal;
modifying the input signal using a flux stabilisation signal, which modified input signal causes the flux produced by the phase winding to be altered to stabilise the output of the machine.

21. A method as claimed in claim 20 including causing the flux stabilisation signal to influence the moment at which flux decay in the phase winding is initiated according to the input signal.

22. A method as claimed in claim 20, including generating the stabilisation signal as a variable signal which has a period that is coincident with the period of repetition of energisation of the phase winding.

23. A method as claimed in claim 22 wherein the generating of the flux stabilisation signal is carried out so that the flux stabilisation signal is variable with time.

24. A method as claimed in claim 22 wherein the generating of the flux stabilisation signal is carried out so that the flux stabilisation signal is variable with rotor angle.

25. A method as claimed in claim 22 wherein the generating of the flux stabilisation signal is carried out so that the flux stabilisation signal has a sawtooth waveform.

26. A method as claimed in claim 25 including causing the sawtooth waveform to define a threshold input signal at which flux decay is initiated.

27. A method as claimed in claim 20, including producing the input signal from a flux feedback signal, a flux demand signal and the flux stabilisation signal.

28. A method as claimed in claim 27, including comparing the flux feedback signal with a combination of the flux demand signal and the flux stabilisation signal.

29. A method as claimed in claim 27, including comparing the flux demand signal with a combination of the flux feedback signal and the flux stabilisation signal.

30. A method as claimed in claim 28, wherein the generating of the flux stabilisation signal is carried out so that the flux stabilisation signal has a sawtooth waveform, and so that the gradient of the sawtooth waveform is negative.

31. A method as claimed in claim 29, wherein the generating of the flux stabilisation signal is carried out so that the flux stabilisation signal has a sawtooth waveform, and so that the gradient of the sawtooth waveform is positive.

32. A method as claimed in claim 31 wherein the generating of the flux stabilisation signal is carried out so that the gradient is a constant value throughout the cycle.

33. A method as claimed in claim 20 including being responsive to the flux stabilisation signal for maintaining the rise and fall of flux produced by the phase winding over an electrical cycle to be substantially equal.

34. A method as claimed in claim 20, including determining when a point in a phase energisation cycle is reached, initiating timing to a predetermined rotor position, deriving the input signal from a signal indicative the flux for the phase winding at the said position, adding the flux stabilisation signal to the input signal, and extrapolating from the modified input signal to a predetermined threshold of flux demand to determine the moment at which flux decay in the phase winding is initiated.

35. A method as claimed in claim 25 including varying the gradient of the sawtooth waveform according to the speed of the machine.

36. A method as claimed in claim 25 including causing the sawtooth waveform to have a fixed peak amplitude that does not vary with the speed of the machine.

37. A method as claimed in claim 20 including selecting one of a reluctance machine and a brushless DC machine to be the brushless electrical machine.

38. A controller for a switched reluctance machine having a rotor, a stator with at least one phase winding and switch means for energising the at least one phase winding, the controller being operable to generate actuation signals for actuating the switch means, the controller including first switch control means for producing switch-off signals for controlling the switch means when the flux in the at least one phase winding exceeds a flux demand signal and second switch control means for producing actuation signals for controlling the switch means according to the position of the rotor relative to the stator.

39. A controller as claimed in claim 38, further comprising a comparator arranged to receive a first flux signal indicative of the flux in the at least one phase winding and a second flux signal indicative of the demanded flux, and to produce a switch-off signal when the first flux signal exceeds the second flux signal.

40. A controller as claimed in claim 38 in which the second switch control means are operable to produce a switch-on signal when the rotor reaches a predetermined position relative to the stator, whereby the flux in the phase winding is increased.

41. A controller as claimed in claim 40 in which the second switch control means are operable to produce a freewheel signal for freewheeling the current in the at least one phase winding when the rotor reaches a freewheel position relative to the stator, whereby flux in the phase winding is allowed to decay.

42. A controller as claimed in claim 38 in which the second switch control means are operable to produce a switch-off signal when the rotor reaches a switch-off position relative to the stator, whereby the flux in the phase winding is driven down.

43. A controller as claimed in claim 11 in which the gradient is constant value throughout the cycle.

44. A method as claimed in claim 30 wherein the generating of the flux stabilisation signal is carried out so that the gradient is a constant value throughout the cycle.

* * * * *